United States Patent [19]

Beerwald et al.

[11] Patent Number: 4,508,554
[45] Date of Patent: Apr. 2, 1985

[54] PLASMA PROCESS FOR THE PRODUCTION OF A DIELECTRIC ROD

[75] Inventors: Hans Beerwald, Kall-Sistig; Guenter Boehm; Guenter Glomski, both of Bochum, all of Fed. Rep. of Germany

[73] Assignee: Schott Glaswerke, Mainz, Fed. Rep. of Germany

[21] Appl. No.: 493,844

[22] Filed: May 12, 1983

[30] Foreign Application Priority Data

May 12, 1982 [DE] Fed. Rep. of Germany ....... 3217839

[51] Int. Cl.³ .............................................. C03B 37/01
[52] U.S. Cl. ......................................... 65/3.1; 65/3.12; 65/3.2; 219/10.55 M; 219/121 PL; 427/38; 427/39
[58] Field of Search ............................ 65/3.12, 3.2, 3.1; 427/39, 38, 45.1; 219/10.55 A, 10.55 M, 121 P, 121 PY, 121 PL

[56] References Cited

U.S. PATENT DOCUMENTS

| 4,062,665 | 12/1977 | Izawa et al. | 65/3 |
| 4,125,389 | 11/1978 | King | 219/10.55 M X |
| 4,224,046 | 9/1980 | Izawa et al. | 65/3 |
| 4,231,774 | 11/1980 | Maklad | 65/3 |
| 4,417,911 | 11/1983 | Cundy et al. | 65/3.12 |

FOREIGN PATENT DOCUMENTS 1574115  9/1980  United Kingdom .

Primary Examiner—Kenneth M. Schor
Attorney, Agent, or Firm—Millen & White

[57] ABSTRACT

A plasma process for the production of a dielectric rod 6 from gaseous starting materials, causes the rod 6 to grow in the axial direction by deposition on its end face. This is effected by conducting microwave energy via the rod 6 to its end face, this energy maintaining a gaseous discharge 7 at the end face. The starting material flows into this gaseous discharge as a gaseous jet by means of a concentric nozzle system 8.

16 Claims, 1 Drawing Figure

U.S. Patent
Apr. 2, 1985
4,508,554
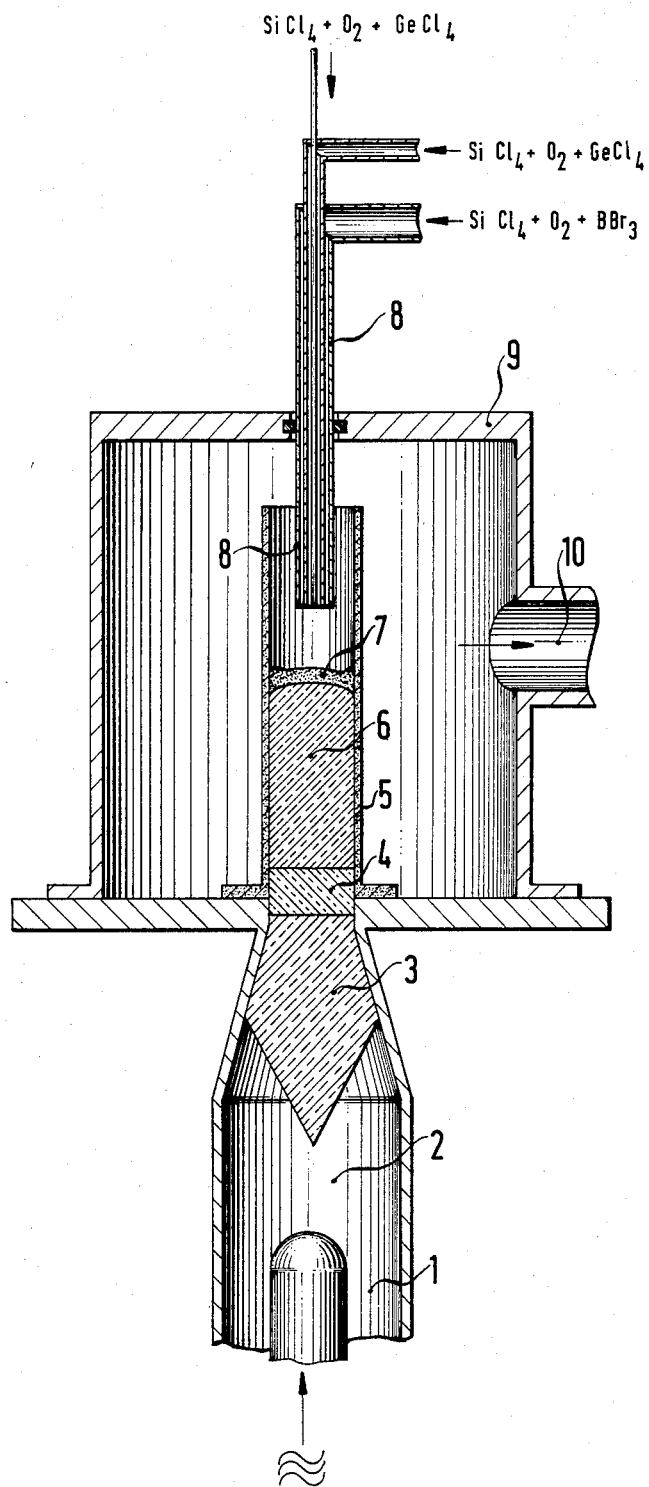

PLASMA PROCESS FOR THE PRODUCTION OF A DIELECTRIC ROD

BACKGROUND OF THE INVENTION

The present invention relates to a plasma-based process for the production of a dielectric rod from gaseous starting materials wherein the rod grows in the axial direction by deposition on its end face.

Such processes are used to manufacture high-purity glass materials or ceramic materials in rod form, especially preforms of quartz glass, from which optical waveguides are drawn for the communications industry.

Such processes are disclosed in the following references: DAS, No. 2,715,333; DOS No. 2,835,326; DOS No. 2,913,726; and DOS No. 2,919,619 (U.S. Pat. Nos. 4,062,665, 4,224,046, 4,231,774 and GB No. 1574115). all of whose disclosures are entirely incorporated by reference herein. These deal with the production of preforms from quartz glass having a gradient refractive index profile obtained by radially varied doping of the rod. The nozzle systems and nozzle movements required for this purpose, as well as the feeding of the doping material, form a large part and the main emphasis of these disclosures.

The advantage of the plasma method as compared with the flame hydrolysis method to achieve the desired growth has been recognized. In the plasma process, the nozzles are equipped, in part, with a plasma-generating device and are fashioned as plasma burners. In the prior art, the starting rod member, in most cases a round plate, is provided with a drive means which allows the rod to rotate during its manufacture.

SUMMARY OF THE INVENTION

It is an object of this invention to improve such methods and devices.

It is another object of this invention to improve such methods and devices by restricting the reaction zone, and thus the plasma zone, to a layer at the end face of the rod being manufactured and by placing the nozzle system outside of the plasma zone and eliminating the need to use plasma generating nozzles.

Upon further study of the specification and appended claims, further objects and advantages of this invention will become apparent to those skilled in the art.

These objects have been attained according to this invention by conducting microwave energy via the rod up to its end face, whereby the microwave energy is effective to maintain a gaseous discharge at its end face, the starting material flowing into this gaseous discharge as a gaseous jet by means of one or several nozzles thereby becoming part of a plasma.

In order to improve the waveguide characteristic of the rod and hence the performance characteristic of this invention and to avoid ignition of the gaseous discharge at the nozzle system, a preferred embodiment of this invention provides that the rod be coaxially arranged in an electrically conductive tube dimensioned so that the excited waveguide mode can propagate only in the tube section wherein the dielectric rod is arranged, whereas, in the empty tube above the end face, the waveguide limit frequency is higher than the microwave frequency employed thereby preventing propagation of microwave energy in the empty tube and spatially limiting the extent of that energy.

In a preferred embodiment, a rotationally symmetrical microwave mode is used, for example an $E_{On}$ mode, or a rotating, not rotationally symmetrical microwave mode, for example an H mode circularly polarized on the axis is used.

BRIEF DESCRIPTION OF THE DRAWING

Various other objects, features and attendant advantages of the present invention will be more fully appreciated as the same becomes better understood when considered in conjunction with the accompanying drawing, and wherein:

FIG. 1 illustrates one embodiment of a preferred version of this invention in a longitudinal sectional view.

DETAILED DISCUSSION

In the preferred embodiment, suitable waveguide tubes include, for example, a graphite tube, or a quartz tube coated on the inside with graphite or lined with a temperature-resistant metallic foil, or an equivalent material which forms a microwave waveguide. The processes proposed, for example, in DAS No. 2,837,261, whose disclosure is incorporated by reference herein, for mandrels can be utilized for producing the inner coating with graphite. The internal diameter of the tube must be of such a size that the selected excited hollow waveguide mode can propagate in the section wherein the dielectric rod is disposed; however, this diameter must not be so large that the excited waveguide mode can also propagate in the empty tube above the end face. In the latter zone, The cut-off frequency of the waveguide mode must thus be selected higher than the microwave frequency employed using the usual conventional considerations. See, e.g., M. Marcowitz, Waveguide Handbook, MIT Rad. Lab. Series Vol. 10, New York 1951, whose disclosure is entirely incorporated by reference herein.

Details of the various aspects of the process and device of this invention will be routinely selected by those skilled in the art in accordance with conventional considerations and in conjunction with the mentioned requirements of this invention. For example, details enabling the routine selection of conditions and apparatus for achieving all aspects of this invention, including, for example, the generation and propagation of microwave power; mode configuration, generation, selection and propagation; component compositions, spacings, sizes, shapes, etc., e.g., of cavities, rods, tubes, etc. necessary to achieve the basic effect of this invention, to establish the necessary limit frequency, etc.; selection of microwave power and frequency; etc., are disclosed in many prior art references, e.g., in N. Marcowitz, Waveguide Handbook, MIT Rad. Lab. Series Vol. 10, New York 1951;

A. F. Harvey, Microwave Engineering, Academic Press, London 1963;

A. D. McDonald, Microwave Breakdown in Gases, John Wiley & Sons Inc., New York 1966, whose disclosures are entirely incorporated by reference herein.

Basically, in order to achieve the necessary rod end face discharge, and resultant ionization of the gaseous feed, it is only necessary to conventionally propagate sufficient microwave power in the rod by disposing it in the usual effective alignment with a microwave generation conduction system.

One of the primary advantages attained by this invention is that it is possible to avoid using plasma-generating devices at the nozzles; and that the nozzle system can be located outside of the reaction zone, whereby higher-precision and more complicated nozzle systems can be installed. Thus, the danger of deposition on the nozzles is lower. Further advantageously, when using a rotationally symmetrical or rotating microwave mode, as mentioned above, and a rotationally symmetrical nozzle system, it is unnecessary to rotate the rod being produced.

Typically, microwave power is in the range of 0,5–5 kw and the frequency is 1–10 GHz. Dielectric rod diameters and hence tube 5 inner diameters generally are 10–100 mm. Usually, the nozzles will be separated from the rod end face by 50–300 mm and will be configured conventionally to achieve a rotationally distribution of composition usually varying radially.

Dielectric rod materials which can be grown include quartz glass silicon carbide, silicon sulfide, germanium nitride, boron nitride, gallium nitride, gallium arsenide, $Al_2O_3$. In the quartz and other systems, typical gas feeds are fully conventional and are conventionally chosen and arranged to achieve the desired index gradient if a gradient is desired. This aspect of the invention is fully conventional and discussed, e.g., in the mentioned references. Similarly, suitable gas flow rates, arrangements and relative amounts are selected conventionally, perhaps with a few routine preliminary experiments. For example, conventional combinations of $SiCl_4$, $O_2$, $GeCl_4$, and $BBr_3$ are employed to form a glass composition of $SiO_2$, $GeO_2$ and $B_2O_3$ as shown in FIG. 1. Also suitable are:

silicon carbide (silane+methane/ethylene)
silicon sulfide (silane+$H_2S$)
germanium nitride (germanium hydride+ammonia)
boron nitride (diborane+ammonia)
gallium nitride (digallane+ammonia)
gallium arsenide (digallane+arsenic)
aluminum oxide (aluminum chloride+oxygen).

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

With reference to FIG. 1, microwave power of about 2 kw at a frequency of 2.45 GHz is introduced into the coaxial conductor system 1 as a normal line wave. The rotationally symmetrical $E_{Ol}$ hollow waveguide mode is excited in the empty tube section 2, the internal diameter of which is 120 mm; this mode spreads toward the narrowed cross section filled with quartz glass. In order to obtain a reflection-free transition to the small cross section, the quartz glass member 3 is shaped conically toward the generator. In the narrowed cross section having a diameter of 60 mm, a thick (20 mm) disk 4 of quartz glass, projecting into the graphite tube 5, is arranged as the starting member for the quartz rod 6 to be produced. The strength of the microwave field rapidly declines above the end face of the starting member or of the growing rod. For this reason, only a short plasma zone 7 is formed at the end face. The starting materials for the rod flow into the plasma zone in the form of a gaseous jet by means of the concentric nozzle system 8, which latter is similar to the one proposed in DOS No. 2,835,326, whose disclosure is incorporated by reference herein. In the plasma zone, the molecules are dissociated, and new molecules are formed on the end face, representing new growth of the rod material. By conventionally varying the introduced gaseous mixtures, the throughput in the nozzle ducts, and the spacing of the nozzles from the end face, an adjustment can be routinely found producing a rod having the desired radial refractive index profile. The nozzle system is displaceably arranged in the vacuum vessel 9 so that the spacing of the system with respect to the end face of the growing rod can be kept constant. The electrical distance between the end face and the microwave generator is maintained constant by a variable phase shifter. The gas pressure at the pump socket 10 is about 1 millibar.

It is, of course, also possible to employ nozzle systems corresponding to DAS No. 2,715,333; DOS No. 2,913,726; and DOS No. 2,919,619 as mentioned. Since these nozzle systems are not rotationally symmetrical, however, it is necessary to impart rotation to the rod or to the nozzle systems using fully conventional methods.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A plasma-based process for growing a dielectric rod from its corresponding gaseous starting materials, said process comprising conducting microwave energy in vacuo through the rod or a starting member for the rod to the end face of the rod or starting member, wherein said energy is effective to maintain a gaseous discharge at said end face, and simultaneously flowing said gaseous materials as a gaseous jet into the gaseous discharge by means of at least one nozzle, whereby said gaseous materials react with said end face to form a growing dielectric rod.

2. A process of claim 1 wherein said microwave energy is propagated in said growing dielectric rod in a mode which is symmetrical with respect to the longitudinal axis of said growing dielectric rod.

3. A process of claim 1 wherein said microwave energy is propagated in said growing dielectric rod in a mode which is unsymmetrical with respect to the longitudinal axis of said growing dielectric rod and said rod is rotated about said longitudinal axis during the conduction of the microwave energy.

4. A process of claim 1 wherein the dielectric rod is a quartz rod.

5. A process of claim 2 wherein the microwave mode is an $E_{On}$ mode.

6. A process of claim 3 wherein the microwave mode is an H mode circularly polarized on the axis of propagation.

7. A process of claim 1 wherein said gaseous jet is rotationally symmetrical with respect to the longitudinal axis of said growing dielectric rod.

8. A process of claim 1 wherein said gaseous jet is rotationally unsymmetric with respect to the longitudinal axis of said growing dielectric rod and either said nozzle or said rod is rotated about said longitudinal axis.

9. A process of claim 1 for growing a dielectric rod to a certain final length, wherein said rod is grown coaxially in an electrically conductive tube longer than said final length and which forms a microwave waveguide of a dimension such that the waveguide limit frequency of said tube is higher than the microwave frequency of said microwave energy, whereby the excited waveguide mode of said microwave energy in said tube can propagate only in the tube section wherein said growing dielectric rod is disposed and not in the empty part of the tube above said end face at which said discharge is occurring, the electrical distance between the point of generation of the microwave energy and the growing end face of said rod being kept essentially constant throughout the growth of the rod.

10. A process of claim 9 wherein said microwave energy is propagated in said growing dielectric rod in a mode which is symmetrical with respect to the longitudinal axis of said rod.

11. A process of claim 9 wherein said microwave energy is propagated in said growing dielectric rod in a mode which is unsymmetrical with respect to the longitudinal axis of said rod and said rod is rotated about said longitudinal axis during the conduction of the microwave energy.

12. A process of claim 9 wherein the dielectric rod is a quartz rod.

13. A process of claim 10 wherein the microwave mode is an $E_{On}$ mode.

14. A process of claim 11 wherein the microwave mode is an H mode circularly polarized on the axis of propagation.

15. A process of claim 9 wherein said gaseous jet is rotationally symmetrical with respect to the longitudinal axis of said growing dielectric rod.

16. A process of claim 9 wherein said gaseous jet is rotationally unsymmetrical with respect to the longitudinal axis of said growing dielectric rod and either said nozzle or said rod is rotated about said longitudinal axis.

* * * * *